US012663056B2

(12) United States Patent
Giner et al.

(10) Patent No.: US 12,663,056 B2
(45) Date of Patent: Jun. 23, 2026

(54) DRIVE BELT

(71) Applicants: Arntz Beteiligungs GmbH & Co. KG, Höxter (DE); Textilforschungsinstitut Thüringen-Vogtland e.V., Greiz/Thür (DE)

(72) Inventors: Ignacio Giner, Paderborn (DE); Samuel Bollmann, Netzschkau (DE); Pulkit Mishra, Gera (DE); Annika Gambke, Gera (DE)

(73) Assignees: Arntz Beteiligungs GmbH & Co. KG, Höxter (DE); Textilforschungsinstitute Thüringen—Vogtland e.V., Greiz/Thür (DE)

( * ) Notice: Subject to any disclaimer, the term of this patent is extended or adjusted under 35 U.S.C. 154(b) by 561 days.

(21) Appl. No.: 18/118,997

(22) Filed: Mar. 8, 2023

(65) Prior Publication Data

US 2023/0287961 A1     Sep. 14, 2023

(30) Foreign Application Priority Data

Mar. 9, 2022     (DE) .......................... 102022105552.3

(51) Int. Cl.
| | |
|---|---|
| *F16G 5/16* | (2006.01) |
| *F16G 5/20* | (2006.01) |
| *G01K 11/12* | (2021.01) |

(52) U.S. Cl.
CPC .................. *F16G 5/16* (2013.01); *F16G 5/20* (2013.01); *G01K 11/12* (2013.01)

(58) Field of Classification Search
CPC ..... F16G 5/16; F16G 5/20; F16G 1/16; F16G 1/28; F16G 5/14; G01K 11/12; G01K 1/14
USPC .......................................................... 116/217
See application file for complete search history.

(56) References Cited

U.S. PATENT DOCUMENTS

| | | | | |
|---|---|---|---|---|
| 10,006,536 | B2 * | 6/2018 | Hazim | .................... F16H 57/01 |
| 2005/0139142 | A1 * | 6/2005 | Kelley | .................. B60C 13/001 |
| | | | | 116/34 A |
| 2020/0039196 | A1 * | 2/2020 | Hodjat | .................. F16L 11/124 |
| 2023/0250268 | A1 * | 8/2023 | Loyd | ........................ F16G 1/10 |
| | | | | 428/35.7 |

FOREIGN PATENT DOCUMENTS

| | | |
|---|---|---|
| CN | 106611206 A | 5/2017 |
| DE | 102006001487 A1 | 7/2007 |
| DE | 102014003564 A1 | 9/2015 |
| DE | 102014214330 A1 | 1/2016 |
| EP | 0597923 B1 | 10/1997 |

(Continued)

*Primary Examiner* — Kristina M Deherrera
*Assistant Examiner* — Evan Mancini
(74) *Attorney, Agent, or Firm* — Bodner & Bodner, PLLC; Christian P. Bodner; Gerald T. Bodner

(57) ABSTRACT

Die invention relates to a drive belt, in particular V-belt, V-ribbed belt or toothed belt on an elastomer or polyurethane base, with belt backing and at least one tension member, comprising an optically detectable load and wear state display. According to the invention, a recess if formed over at least one belt section, and accommodated a flat support, wherein the support is furnished, in particular coated or impregnated with irreversibly thermochromic pigments, in such manner that a colour change or discolouration takes place at a predeterminable temperature load threshold.

9 Claims, 8 Drawing Sheets

(56)        References Cited

FOREIGN PATENT DOCUMENTS

| EP | 1481229 | B1 |   | 5/2007 |
| EP | 3117122 | B1 |   | 4/2019 |
| JP | 2003096292 | A | * | 4/2003 |
| JP | 2012021628 | A | * | 2/2012 |

* cited by examiner

1

9

5          7          6

1

9

5          6          7

DRIVE BELT

The invention relates to drive belts, in particular V-belts, V-ribbed belts or toothed belts on an elastomer or polyurethane base, with belt backing and at least one tension member, comprising an optically detectable load and wear state display, a structure consisting of a support material with a nonwoven, knitted, woven or crocheted or film base, and a use of a structure as sensor for optical detection without electronics of elevated temperatures during operation of the drive belt.

A V-ribbed belt and a method for displaying a wear state of a V-ribbed belt is already known from EP 3 117 122 B1.

According to the definition of the problem stated in that document, it should also be possible to check the wear state of a V-ribbed belt when it has been fitted. In this regard, a material abrasion at the base 14 of the rib is detected as the criterion for the wear state.

A V-ribbed belt of such kind comprises a belt backing and a tension member arranged underneath the belt backing, and a substructure, in which V-ribs with sloping rib flanks are constructed, each extending in the longitudinal direction of the V-ribbed belt and parallel to one another and separated by an intermediate space.

In the event of material abrasion on the substructure, a first material in the rib base 14 is exposed, while the surface of the rib flanks is still formed by a second material. The material abrasion in the rib base 14 is detected as the criterion for the wear state. It is thus easily possible to make such an observation visually, by creating the surface in the rib base 14 from one material, and arranging a visibly distinct material underneath it. The optically detectable exposure of the visibly distinct material serves as the criterion for the wear state.

The drawback associated with a solution of such kind is the need to integrate two different materials with different colour properties in the manufacturing process of V-ribbed belts of such kind.

Furthermore, it is only possible to detect wear states that are attributable directly of indirectly to material abrasion.

From EP 1 481 229 B1, it is known to use a thermochromic material as a component of a rubber product, in particular a tyre, a strap or a belt. The thermochromic material serves as an indicator based on a visible change of colour when a certain temperature range is exceeded. From this it is concluded that the capability of the corresponding product has deteriorated and it needs to be replaced.

From EP 0 597 923 B1, a cord with a heat-sensitive component is known, which component undergoes a visible change in appearance when it has been exposed to a selected, elevated temperature due to deformation or friction in conjunction with a release of heat of the individual strands of the cord.

The elastomer part according to DE 10 2014 214 330 A1 and the method explained therein for monitoring the operating capability of an elastomer part are intended to permit detection as to whether and to what extent a corresponding elastomer part has been exposed to thermal load since it was put into operation. This should enable conclusions to be drawn as to how long the elastomer part will remain usable in operation.

In this respect, the elastomer part presented in that document has at least one region with thermochromic properties that is visible or can be detected optically from the outside.

This region which can be detected optically from the outside may be created by means of a coating applied directly over at least a portion of the surface of the elastomer part.

Alternatively, at least a section of the elastomer part may consist of a material to which thermochromic pigments or fillers have been added.

The materials used to enable to the thermochromic properties are chosen with consideration for the operating temperatures that arise in the respective use case. In particular, the region of the elastomer part that is visible from the outside should change colour at critical temperatures.

Accordingly, it is possible in this way to conclude from a visual check whether the corresponding part has suffered any damage, thereby allowing statements to be made about the remaining service life of the part.

Thus, with the solution according to DE 10 2014 214 330 A1 it is possible to quickly detect signs of wear, particularly those caused by the effects of temperature. However, the addition of thermochromic pigments or fillers to parts made from elastomer material that are exposed to high loads impairs the durability and the mechanical properties of the part in question.

On the other hand, if a coating is applied to the surface of an elastomer, a structure forms which is unfavourable for many operational cases.

For example, if a coating with thermochromic material were applied to the belt backing side of a drive belt, in particular a V-belt, this would lead to problems with regard to "backrolling capability". Furthermore, such a layer would wear off relatively quickly.

All things considered, integrating a method for applying or incorporating thermochromic materials in a process that accompanies temperature-controlled vulcanisation is counterproductive, since the thermal treatment in the manufacturing process itself brings about a change in the properties of the thermochromic particles or substances.

Given the situation as described in the preceding, it is therefore the object of the invention to describe an advanced rive belt that is equipped with an optically detectable load and wear state display, which itself has no adverse effects on the actual drive belt manufacturing process and may be prefabricated in such manner that it is possible to take into account the extremely varied temperature profiles in corresponding drive belt products.

The object of the invention is solved with a drive belt 1 according to the combination of features described in the claims, supported by a structure and with the use of the structure as a sensor for optical detection of elevated temperatures by non-electronic means during use of drive belts.

BRIEF DESCRIPTION OF THE SEVERAL VIEWS OF THE DRAWINGS(S)

Figure 1A:
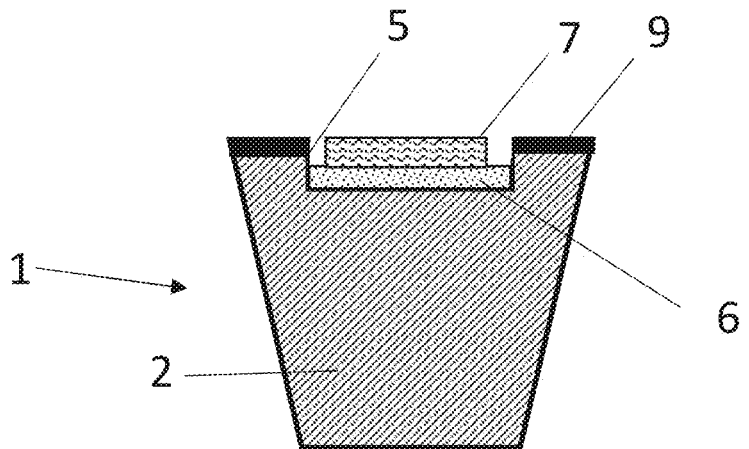
FIG. 1 shows cross sections of a drive belt in the shape of a v-belt, a v-ripped belt and a tooth belt.

According to the invention, a recess 5 is formed on a drive belt 1, for example on the back of the belt, at least over a section of the belt.

This recess 5 may preferably be created in the manufacturing process, that is to say in the process of vulcanising the belt.

Therefore, it is not necessary to create recesses in the belt, particularly in the belt backing 9, by material removal afterwards, which weakens the belt and creates predetermined breakage points.

Thus, the recess 5 serves to accommodate a film-like or textile structure, adapted to the dimension of the recess 5, wherein the film-like or textile structure is furnished, in particular coated, e.g. printed or impregnated, with irreversible thermochromic pigments 7, in such manner that a colour change or discolouration takes place at a predefinable temperature load threshold.

When such a thermal limit load is reached, it is then possible to determine with a simple visual inspection that a certain wear or load condition has been reached. A decision can be made afterwards as to whether the drive belt 1 in question is to be replaced as a preventative measure or whether replacement will not be necessary until the following servicing operation, depending on the servicing schedule.

As was explained previously, the recess 5 is created in the form of a cavity in a step in the belt manufacturing process.

The textile structure consists of a nonwoven material, a woven, a crocheted or knitted fabric. A thermoplastic material may be used in the form of a film.

The textile structure furnished with the irreversibly thermochromic pigments 7 or the film is affixed adhesively in the recess 5.

In this case, it is possible on the one hand to use an adhesive that is compatible with the materials used, particularly with regard to the properties of the drive belt 1.

On the other hand, bonding connections such as ultrasonic welds or vibration weld connections are also possible, if and to the extent that incompatibilities exist with adhesives that would otherwise be necessary.

In a further development of the invention, the recess 5 is formed over the entire course of the belt backing 9. In this case, the textile structure or film has the form of a strip or strand 20 and is inserted and fixed within the recess 5.

The textile structure or film may have multiple layers 10, 11, 12 or sections with thermochromic pigments 7, each of which exhibit discolouration at different temperatures, so that different load states may be represented, in the manner of a traffic light function.

In addition or alternatively thereto, a textile structure or a film with irreversibly thermochromic pigments Z is provided in or an at least one belt flank 13, one rib flank, on the rib base 14 and/or on the tooth 15 in the case of a toothed belt 4.

The irreversibly thermochromic pigments 7 may be contained in a colour coating, or a in a colour application for the textile structure.

In one variant of the invention, the free, visible surface side of the textile structure or film has a layer that is preferably transparent functions as a protective layer 16 against abrasion.

The textile structure or film with its irreversibly thermochromic pigments 7 may be supplied as a plaster-like, prefabricated product 17.

Depending on the thermal behaviour of drive belts taking with consideration for their material characteristics, thermochromic materials and pigments 7 are chosen that cause an irreversible colour change in the relevant, critical temperature range.

The adhesive bonding of the textile structure or film with the drive belt 1 is carried out at normal temperature, in particular at room temperature. The manufacturing and conditioning process of the textile structure or film is also performed in such manner that temperatures which might cause a premature colour change of the pigments are not reached. This applies at least to the step of applying or impregnating with the thermochromic pigments 7 or substances.

According to a further aspect of the invention, a structure is provided which consists a support 6 material based on a nonwoven, knitted, woven or crocheted fabric, or a film, wherein the support 6 material is furnished with at least one containing that contains irreversibly thermochromic pigments Z or consists of such pigments.

The structure also has an underside, which is suitable for adhesive bonding with an elastomer material, in particular a drive belt 1. In addition, an optically transparent protective layer 16 is provided on the upper side.

The structure is preferably designed as a strip 19 or band 20.

The underside may be provided with an adhesive coating 18.

A separating layer 22 may be provided between the adhesive coating 18 and the support 6 material to prevent an undesirable reaction from taking place between the constituents of the adhesive layer 18 and the thermochromic pigments 7 or the material used therefor.

A temperature-dependent actuation behaviour and therewith also the time at which the pigments change colour may be adjusted with the selection of the support 6 material thickness.

When selecting the support 6 material, and choosing the thermochromic pigments 7 and there arrangement relative to the drive belt, it must be ensured that heat is transferred from the drive belt material to the textile structure as evenly as possible, so that the colour change under corresponding temperature load takes place as clearly and unmistakably as possible, and is correspondingly visually detectable.

A further aspect according to the invention is the use of the previously described structure as sensor for optical detection without electronics of elevated temperatures during the operation of drive belts, wherein the sensor is permanently attached to the respective drive belt.

Surprisingly, it has been found that detection of a temperature change in the region of the belt backing 9 during operation of a drive belt 1 is sufficient to recognise certain load cases and load limits, although in the case of V-belts the temperature rise is greater on the belt flanks 13 compared with the temperature on the belt backing 9. The formation of the recess 5 or cavity on the belt backing 9 instead of an arrangement on the belt flanks 13 does not result in any reduction of the load-bearing capacity of the belts, nor any restrictions in their range of use.

In the following text, the invention will be explained in greater detail with reference an embodiment thereof.

Figure 1B:
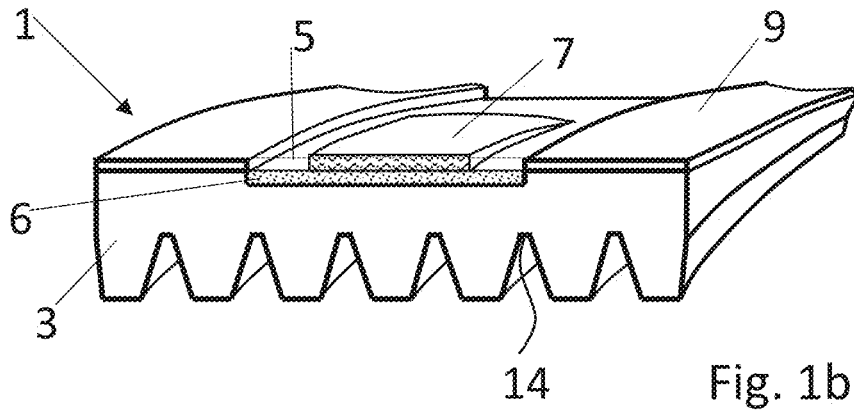
Figure 1C:
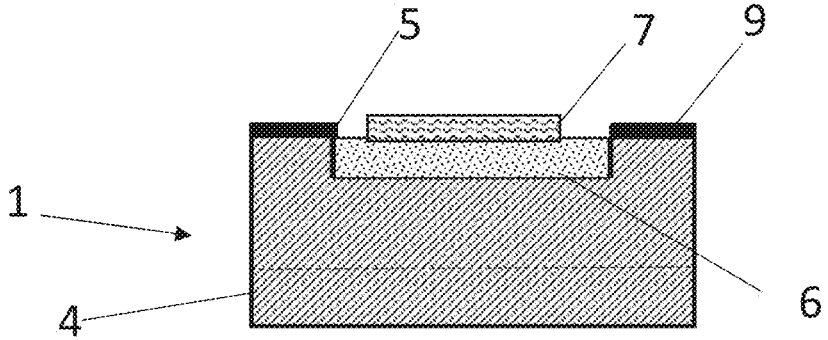

FIG. 1 shows three exemplary cross-sections for a drive belt 1. FIG. 1a shows a V-belt 2 in cross-section. FIG. 1b shows a cross-section of a V-ribbed belt 3. FIG. 1c shows a cross-section of a toothed belt 4. Each of the embodiments contains a recess 5. The recess 5 is incorporated over at least one section of the drive belt. A flat flexible support 6 is located in the recess 5. The support 6 is provided with a thermochromic pigment 7. In the examples shown in FIG. 1, the thermochromic pigment 7 is applied to the support as a layer. In the embodiments in FIGS. 1a, 1b and 1c, the drive belt has a belt backing 9 in each case.

Figure 2:
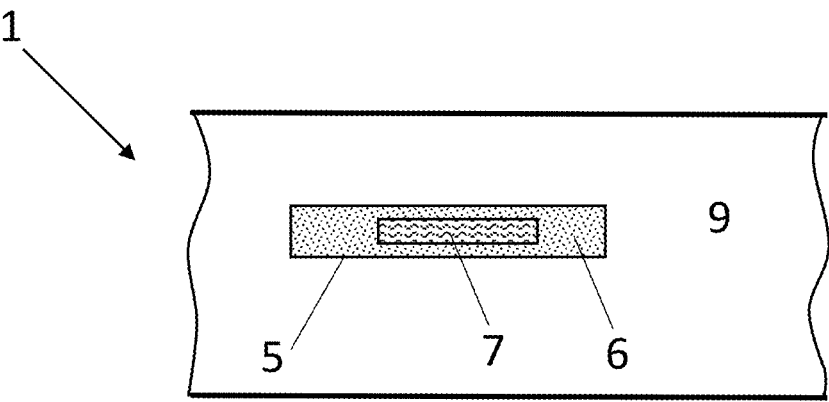
FIG. 2 shows a top view at a back of a belt section including a recess an a support with a pigment inside the recess at a belt section.

FIG. 2 represents an embodiment of a recess 5. The recess 5 is formed on the back of the belt at at least one belt section. The recess accommodates a textile structure or film as a support 6. The support is furnished, in particular coated with a thermochromic pigment 7. However the thermochromic pigment might also be printed or impregnated onto the support 6. The colour of the thermochromic pigment may change colour or shows a discolouration at a predetermined temperature load threshold.

Figure 3:
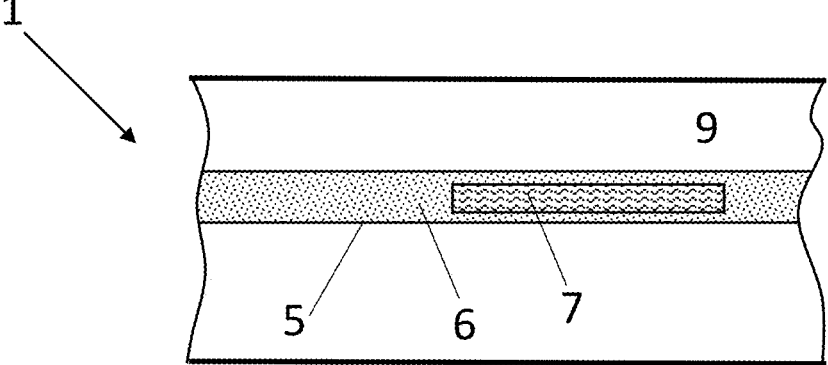
FIG. 3 shows a top view at a section of a back of a belt with a recess over the entire course of the belt backing.

FIG. 3 represents an embodiment for a recess that is formed of the entire course of the belt backing 9. The figure shows a section of a drive belt 1, the recess is formed over the entire course of the drive belt. It accommodates the support 6 with the thermochrome pigment 7.

Figure 4A:
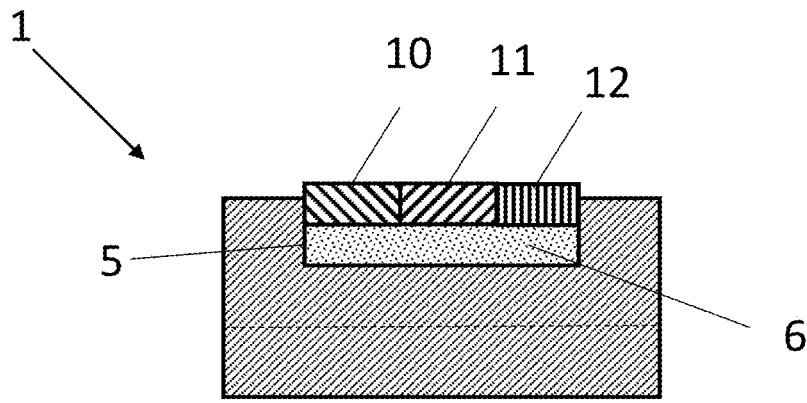
FIG. 4 shows a cross section and a top view of a support of multiple players with traffic light pigments at a drive belt.
Figure 4B:
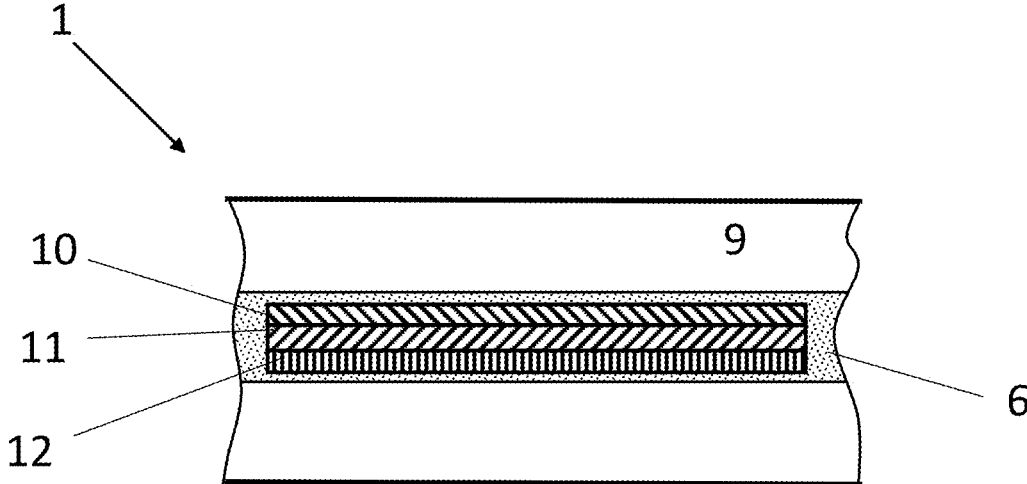

FIG. 4 represents two embodiments of a support 6. The support 6 contains multiple layers 10, 11 and 12 with thermochromic pigments. Each of the pigments of the layers 10, 11 and 12 undergo colour changes at different temperatures. Different load stages can be represented in a manner of a traffic light function. FIG. 4a represents a cross section of a drive belt 1 with recess 5, support 6 and the layers 10, 11 and 12. FIG. 4b represents a section of the drive belt 1 with a top view at the belt backing 9 with the support 6 and the pigments 10, 11 and 12.

Figure 5:
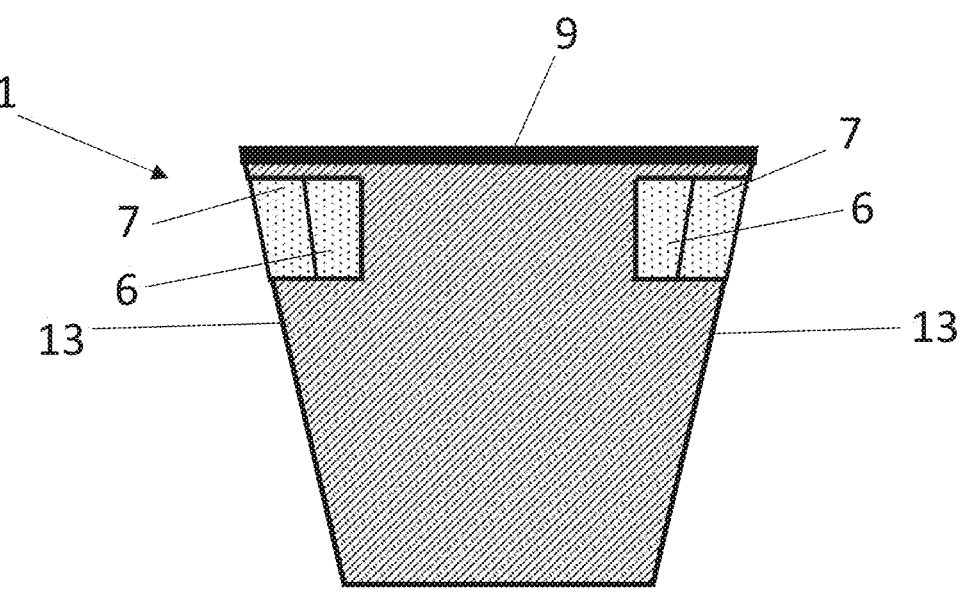
FIG. 5 shows a cross section of a drive belt as a V-belt, showing a textile structure with thermochromic pigments in a belt flank.
Figure 6:
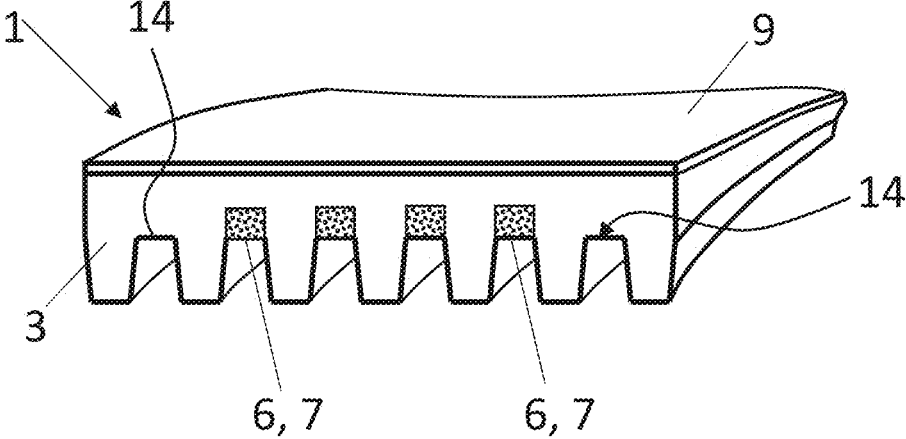
FIG. 6 shows a cross section of a drive belt as a v-ripped belt, showing a textile structure with thermochromic pigments in a belt base.

FIG. 5 represents a cross section of a drive belt 1 wherein the textile structure or film is provided as a support with thermochromic pigments in a belt flank 13. FIG. 6 represents an example of a drive belt 1 as a V-ribbed belt, wherein the support 6 with the thermochromic pigments 7 is provided on the rib base of the V-ribbed belt.

Figures 7A, 7B:
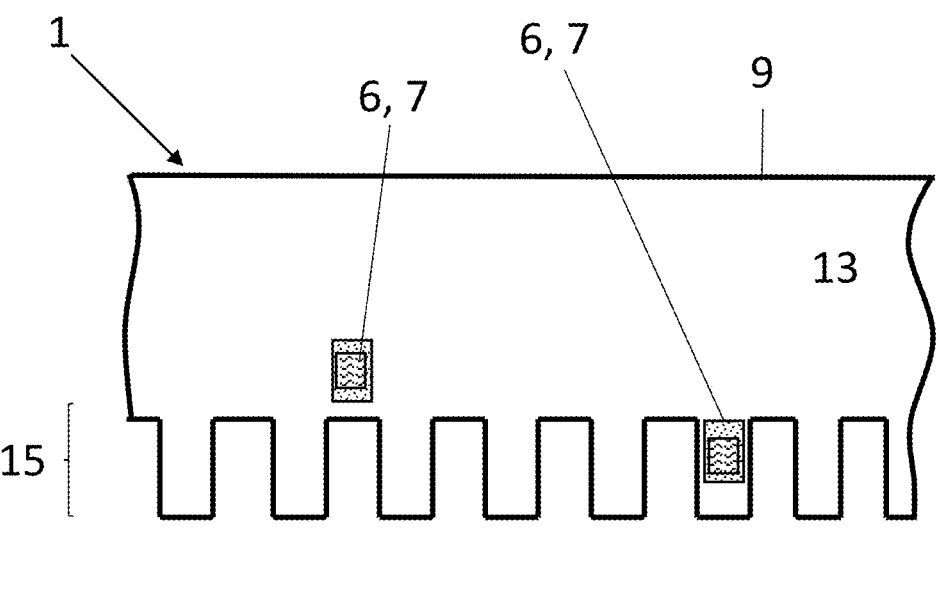
FIG. 7 shows a section of a toothed belt, showing a textile structure with thermochromic pigments near the tooth and on the tooth and on the flank of the toothed belt respectively.

FIG. 7 represents two embodiments of textile structures in proximity of the teeth at a toothed belt. According to FIG. 7a the support 6 with the pigment is located at various positions at the toothed side 15 of the toothed belt, either inside of one tooth or close to the tooth side 15. According to FIG. 7b the support 6 with the pigments 7 as well as the pigments 10, 11 and 12 are located at the belt flank of the toothed belt.

Figure 8:
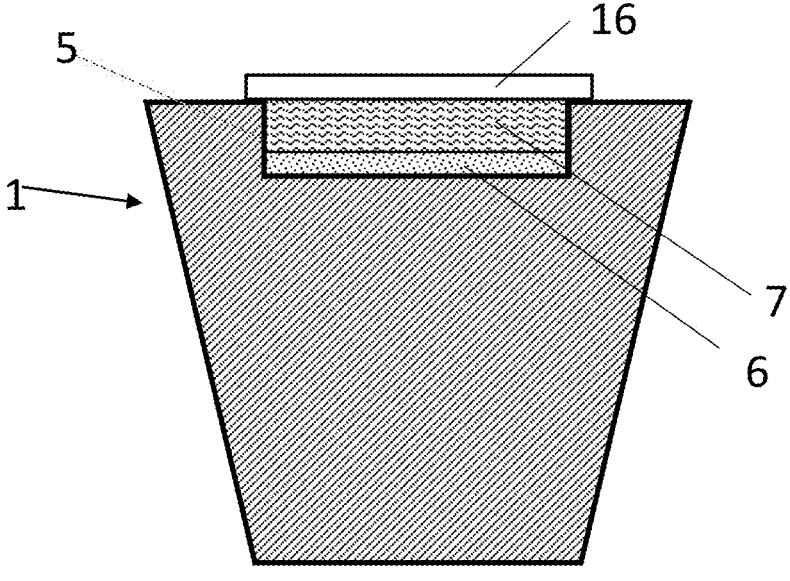
FIG. 8 shows a structure consisting of a support material, a thermochromic pigment with an optically transparent protective layer.

FIG. 8 represents an embodiment of a drive belt 1 with a recess 5, a support 6 and a thermochrome pigment 7. The free visible surface side of the support is furnished with a protective layer 16 against abrasion. The protective layer is transparent at least over the portion with the pigment layer.

Figure 9:
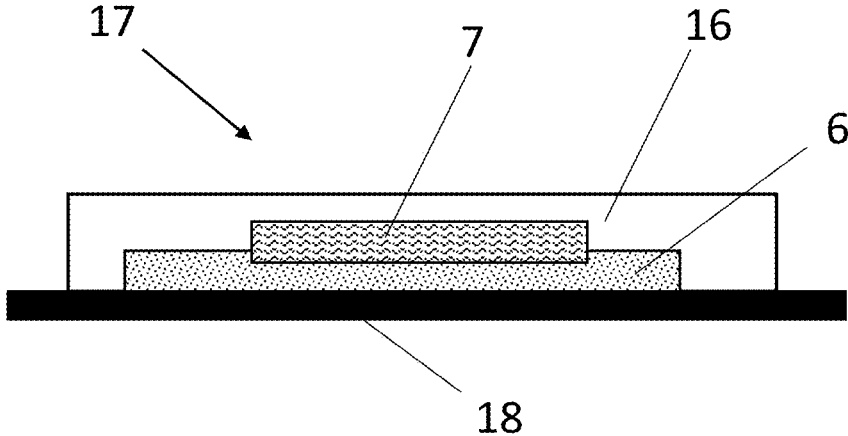
FIG. 9 shows a support with a thermochromic layer as a plaster like product with an adhesive coating.

FIG. 9 represents an embodiment of a plaster like, prefabricated product 17 in cross section. The product consists of a support 6 and pigment 7 with an adhesive coating 18 at backside and a protective layer 16.

Figures 10A, 10B, 10C:
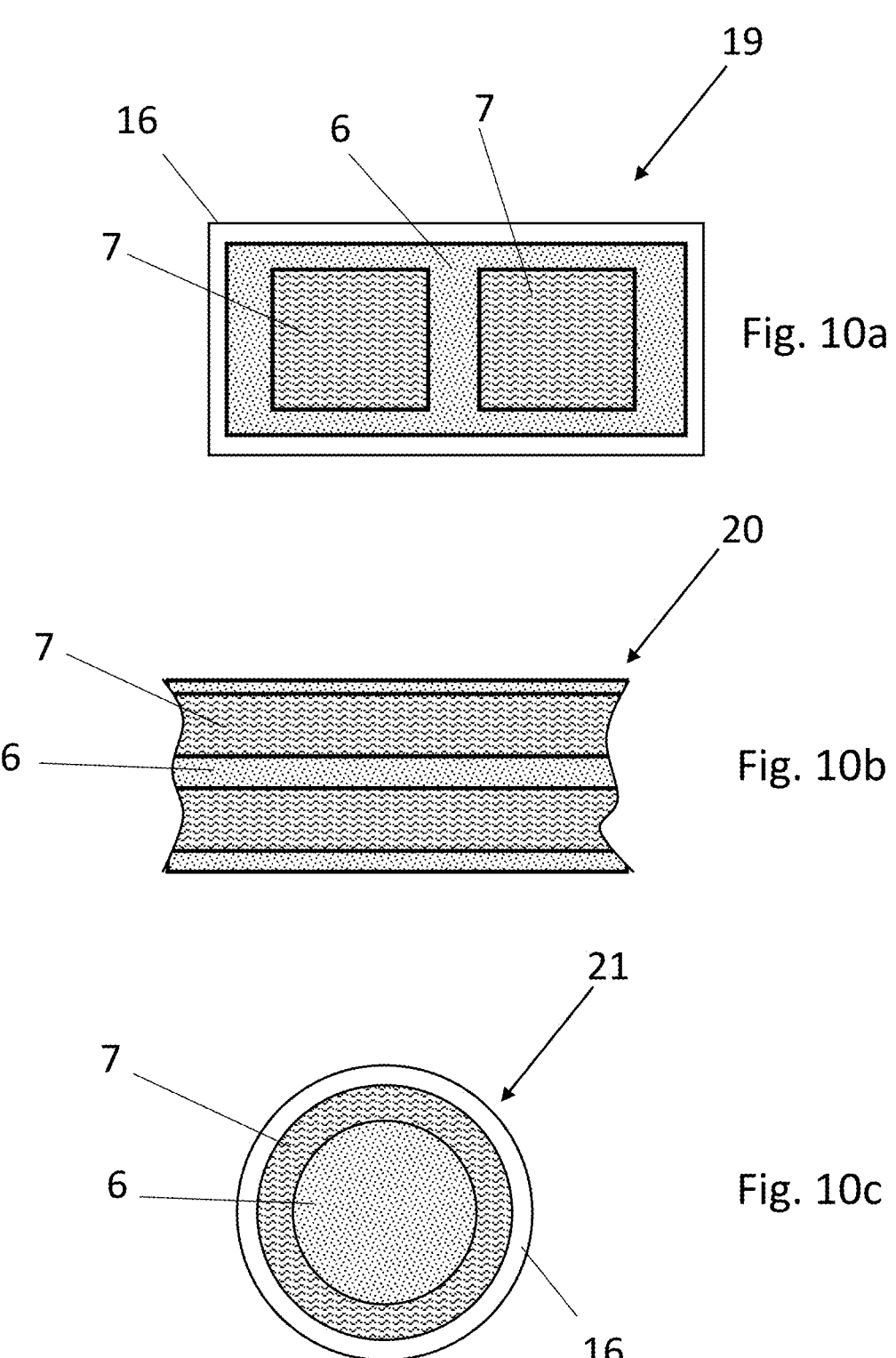
FIG. 10 shows examples of a structure with a support material with coated or printed thermochromic pigments an optically transparent protective layer as a strip, as a band or as a strand.

FIG. 10 represents several embodiments of a structure, consisting of support material on a nonwoven, knitted, woven or crotched or film base. The support material is furnished with at least one coating or print containing irreversibly thermochromic pigments as well as an underside suitable for a materially bonded connection and an optically transparent layer. FIG. 10a represents a strip 19 of support material 6, pigment 7 and protective layer 16. FIG. 10b represents a band 20, consisting of support 6 and pigment 7, FIG. 10c presents a strand 21 with strand-like support 6, pigment 7 and protective layer 16. The strip and the band may be provided with an adhesive layer at their undersides.

Figure 11:
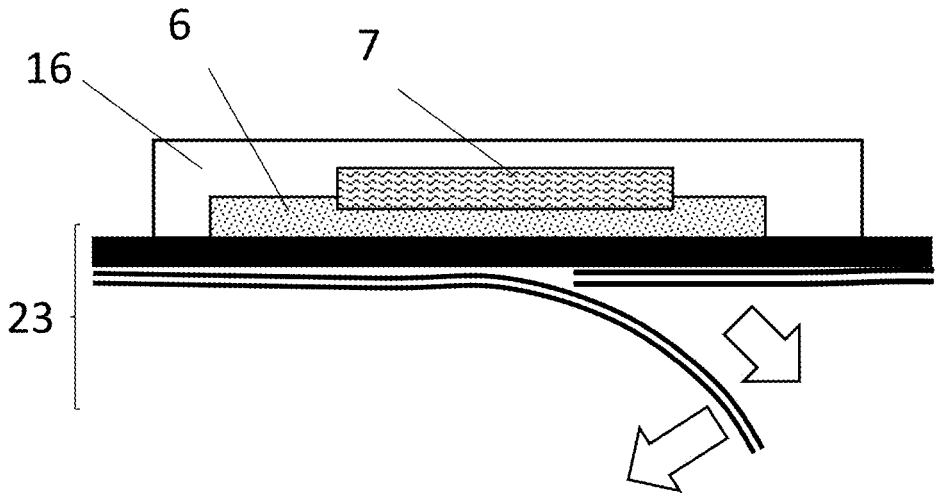
FIG. 11 shows an example of an exposable adhesive coating at the underside of the strip or band.

FIG. 11 represents an embodiment of an exposable adhesive coating 23 at the underside of the strips or bands. The figure presents a support 6 with pigment 7 and protecting layer 16 at the upper side and the adhesive coating 18 as a first component of the exposable adhesive coating 23 at the underside of the support 6. The second component of the exposable adhesive coating 23 consists of a peel-off film 24 or the like, that may be removed immediately before applying the whole structure onto the designated position at the drive belt.

Figure 12:
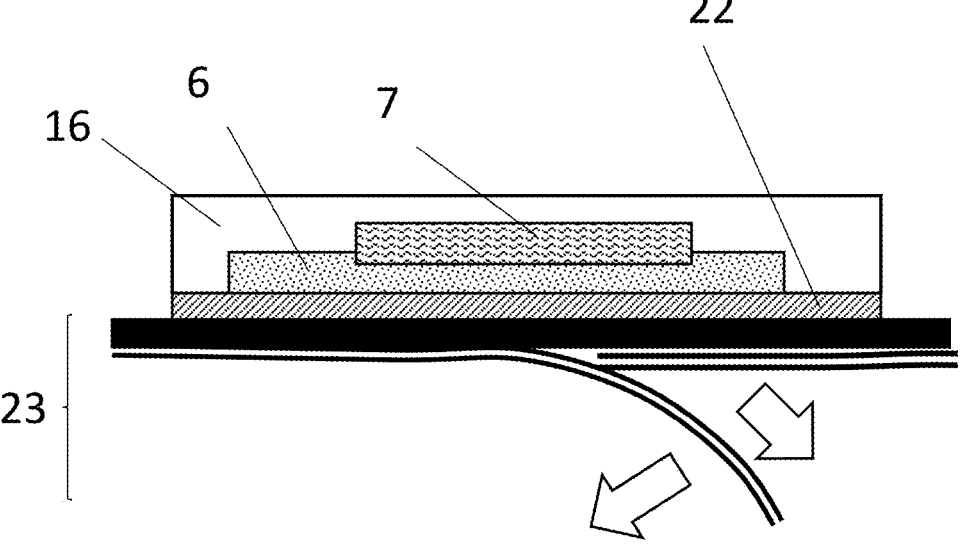
FIG. 12 shows an example of separating layer provided between the adhesive coating and the support material.

FIG. 12 represents an example for a separating layer 22, provided between the adhesive coating 18 and the support 6. The adhesive layer in this example is provided as a component of an exposable coating according to the example at FIG. 11.

With regard to the production of a recess 5 for a drive belt 1, in particular a V-belt 2, in the case of flank-open V-belts a shaped element, for example in the form of a metallic strip, is attached directly to a fixed drum. In this case, this is a standard assembly drum, on which the belt material is assembled in steps.

The shaped element may be treated and/or surrounded with a corresponding separating agent.

The shaped element used then lies transversely over the drum and is wound round the drum. When vulcanisation is complete, the shaped element is removed from the winding.

The production of the exemplary textile structure as a temperature sensor without electronics relies on textile fabrics and nonwoven materials.

The advantage of using nonwoven materials consists in that readily absorb and are effectively penetrated by corresponding thermochromic pigments 7 and dyes.

The colour change may be delayed by means of the choice of substrate materials used relative to the thermochromic pigments 7, as a longer period is needed to bring the substrates to the temperature of the drive belt 1.

Irreversibly thermochromic pigments or dyes are commercially available. In this case, pigments with a colour change temperature from 100° C. and 120° C., with a with colour change from colourless/whitish to magenta were used. A corresponding dye exists as a water-based ink.

When choosing the thermochromic materials, it must be ensured that a colour change is irreversible under all circumstances, and the change cannot be reversed as a result of environmental influences, such a atmospheric humidity.

The underside of the textile starting material may be furnished with a coating, in particular a polyurethane coating, in order to form a barrier layer, as it were, against an adhesive material underneath it, and thereby preventing unfavourable influencing the properties of the thermochromic component or dye.

A protective layer 16 in the form of an exemplary acrylic resin layer may be applied to the upper side of the textile structure. This protective layer 16 prevents undesirable abrasion of the thermochromic dye.

For exemplary purposes, 3M Scotch-Weld cyanoacrylate adhesive in liquid or gel form is used as the adhesive to provide an adhesive bond, that is to say a particular kind of adhesive bonding technology.

It was found that gel-like adhesives are preferable. The adhesive material is selected with consideration for the base material of the drive belts, for example an EPDM rubber.

In order to improve the adhesion properties with respect to the cavity in the drive belt 1, bonding agents may be used, or a physical surface treatment may be carried out.

The thermochromic pigments 7 or a corresponding dye may be applied directly to the textile substrate using a doctor blade in a screen printing process. Air drying serves to avoid an undesirable colour change caused be elevated temperature.

Of course, techniques such as digital printing to apply the colour to the textile substrates are also conceivable.

The protective layer 16 on the upper side forming a cover layer described previously is applied for example in a spray process. Here too, it is important to avoid the generation of any heat or the application of any heat to dry or cure the protective layer 16.

The textile substrate functionalised and equipped in this way is cut to size, in particular punched out in terms of the dimensions of the recesses and cavities in the drive belt 1. In the case of an bonded connection using adhesive, this is applied directly to the region of the cavity or to the underside of the flexible support 6, preferably after a surface cleaning process. Application of a thin layer reduces the likelihood of undesirable colour change reactions due to the chemical properties of the adhesive.

PES textile fabrics and PES nonwovens demonstrated particularly advantageous properties when used as the starter material for the functionalised structure.

Thermochromic dyes used for exemplary purposes demonstrated a clear, irreversible colour change from white to magenta in response to temperatures starting from as low as about 90° C.

The invention claimed is:

1. A drive belt, on elastomer or polyurethane base with belt backing, comprising an optically detectable load and wear state display,
characterized in that
a recess is formed in the belt over at least one belt section, and accommodates a flat, flexible support which is furnished with irreversible thermochromic pigments or a thermochromic layer, in such manner that a colour change or discolouration takes place at a predeterminable temperature load threshold of the belt,
wherein the recess is formed on the back of the belt over at least one belt section, and accommodates a textile structure or film as the support, wherein the textile structure or film is furnished, with irreversible thermochromic pigments in such manner that a colour change or discolouration takes place at the predeterminable temperature load threshold,

wherein the recess is formed over the entire course of the belt backing, and the textile structure or film is present as a band or strand.

2. The drive belt according to claim 1,
characterized in that
the drive belt is a V-belt, a V-ribbed belt or a toothed belt.

3. The drive belt according to claim 1,
characterized in that,
the textile structure or film is coated, printed or impregnated with the irreversible thermochromic pigments.

4. A drive belt, on elastomer or polyurethane base with belt backing, comprising an optically detectable load and wear state display,
characterized in that
a recess is formed in the belt over at least one belt section, and accommodates a flat, flexible support which is furnished with irreversible thermochromic pigments or a thermochromic layer, in such manner that a colour change or discolouration takes place at a predeterminable temperature load threshold of the belt,
wherein
the support, the textile structure or the film contains multiple layers or sections with thermochromic pigments, each of which undergo a colour change at different temperatures, so that different load states can be represented in the manner of a traffic light function.

5. The drive belt according to claim 4,
characterized in that
the drive belt is a V-belt, a V-ribbed belt or a toothed belt.

6. A drive belt, on elastomer or polyurethane base with belt backing, comprising an optically detectable load and wear state display,
characterized in that
a recess is formed in the belt over at least one belt section, and accommodates a flat, flexible support which is furnished with irreversible thermochromic pigments or a thermochromic layer, in such manner that a colour change or discolouration takes place at a predeterminable temperature load threshold of the belt,
wherein
the support with its irreversible thermochromic pigments is provided as a prefabricated product.

7. The drive belt according to claim 6,
characterized in that
the drive belt is a V-belt, a V-ribbed belt or a toothed belt.

8. A structure, consisting of a support material on a nonwoven, knitted, woven or crocheted or film base, wherein the support material is furnished with at least one coating or print containing irreversible thermochromic pigments or consisting of such pigments, further with an underside configured for a materially bonded connection and an optically transparent protective layer,
wherein
the underside has an adhesive coating
and a separating layer is provided between the adhesive coating and the support material.

9. The structure according to claim 8,
characterized in that
the adhesive coating is an exposable adhesive coating.

* * * * *